United States Patent [19]

Elliott

[11] Patent Number: 5,515,213

[45] Date of Patent: May 7, 1996

[54] TAPE DRIVE MACHINE FOR SELECTIVELY READING A PLURALITY OF RECORDING TAPE CARTRIDGES

[75] Inventor: Robert V. Elliott, Wells, United Kingdom

[73] Assignee: M4 Data Limited, Somerset, United Kingdom

[21] Appl. No.: 127,293

[22] Filed: Sep. 27, 1993

[30]   Foreign Application Priority Data

Sep. 29, 1992 [GB] United Kingdom ................... 9220568
Jun. 30, 1993 [GB] United Kingdom ................... 9313518

[51] Int. Cl.$^6$ ................................................. G11B 15/68
[52] U.S. Cl. ................................................. 360/92; 369/36
[58] Field of Search ............................... 360/92, 98.04; 369/36, 37–39, 192–193, 178; 414/273, 276, 277, 280–283

[56]   References Cited

U.S. PATENT DOCUMENTS 3,617,066  11/1971  Foelkel et al. .......................... 360/92
3,811,625   5/1974  Harford et al. ......................... 360/92
4,668,150   5/1987  Blumberg ............................. 414/273

FOREIGN PATENT DOCUMENTS 0102360  6/1983  Japan ..................................... 360/92
0175161  10/1983  Japan ..................................... 360/92
0032156  2/1985  Japan ..................................... 360/92
0197804  4/1978  United Kingdom ................... 360/92

Primary Examiner—A. J. Heinz
Assistant Examiner—Brian E. Miller
Attorney, Agent, or Firm—Renner, Otto, Boisselle & Sklar

[57]   ABSTRACT

A tape drive machine is provided with a magazine to store a plurality of tape cartridges. The magazine may be in the form of a circular carousel or a linear magazine. A selected one of the tape cartridges is transferred from the magazine to a tape deck by a pivoting carriage. In order to produce a compact design of the carousel, the cartridges are stored in the carousel on end, with their longer sides vertical.

10 Claims, 3 Drawing Sheets

1

TAPE DRIVE MACHINE FOR SELECTIVELY READING A PLURALITY OF RECORDING TAPE CARTRIDGES

BACKGROUND TO THE INVENTION

1. Field of the Invention

This invention relates to a tape drive machine of the type comprising a tape deck having a drive hub, a magazine for storing a plurality of tape cartridges, and means for transferring a selected one of the cartridges between the magazine and the deck.

2. Description of the Prior Art

In a known machine of the above type, a pair of jaws are positioned around a cartridge which is selected, the jaws are operated to grip the cartridge and the cartridge is withdrawn from the magazine, and moved to the tape deck.

SUMMARY OF THE INVENTION

An object of the present invention is to obviate the need for a pair of jaws which need to be operated to grip the cartridge.

In accordance with the present invention, the transfer means comprises a carriage which can engage a cartridge in the magazine, and which can be pivoted to move the engaged cartridge between a position in the magazine and a position out of the magazine and aligned with the drive hub; and selector means to move the magazine and carriage relative to each other so that the cartridge with which the carriage engages can be selected. Alternatively stated, a selected cartridge is "tipped out" sideways from the magazine.

In one embodiment, the magazine is arranged to store the cartridges in a circular array around an axis with the cartridges disposed radially, in which case the selector means preferably comprises a motor for rotating the magazine about its axis. In order that the machine takes up little space horizontally, when designed for cartridges which have a longer side dimension, a shorter side dimension and a thickness, the magazine is preferably arranged to store the cartridges with the longer side dimensions generally parallel to the axis of the magazine (and preferably vertical) and with the shorter side dimensions extending generally radially of the axis of the magazine.

In another embodiment, the magazine is arranged to store the cartridges in a linear array along a longitudinal axis of the magazine, in which case the selector means preferably comprises means for moving the magazine along its longitudinal axis. In this case, the magazine is preferably arranged to store the cartridges with their thickness directions parallel to the longitudinal axis of the magazine.

The machine may be designed for storing a common type of single reel tape cartridge having a nominal longer side dimension, shorter side dimension and thickness of 5 inches (127 mm), 4.25 inches (108 mm) and 1 inch (25 mm), respectively (such as an IBM 3480 cartridge). In this case, in the embodiment with a circular magazine, a magazine with a diameter of 17.4 inches (441 mm), for example, can be arranged to accommodate twenty-six, or possibly twenty-seven, cartridges.

In both embodiments, the transfer means is preferably arranged to pivot the carriage through a right angle during transfer of a cartridge between the magazine and the tape deck, and preferably the carriage has a first arm for engaging a lower edge of a cartridge disposed in the magazine, and a second arm for engaging an outer edge of the cartridge, in which case the first arm, the second arm and the pivot axis for the carriage are preferably mutually orthogonal. The magazine may be formed with slot beneath each cartridge through which the first arm of the carriage can pass to engage the lower edge of the cartridge.

During loading of a cartridge, once the cartridge is aligned with the drive hub, the transfer means is preferably arranged to translate the cartridge (possibly only a very short distance) into engagement with the drive hub, and preferably in a direction parallel to the pivot axis of the carriage. The carriage may further comprise a pair of members which sandwich therebetween a cartridge which has been withdrawn from the magazine, for translating the cartridge into and out of engagement with the drive hub.

Other objects, features and advantages of the invention will become apparent from the following description, given by way of example, of two embodiments of the present invention.

DETAILED DESCRIPTION OF THE PREFERRED EMBOIDMENTS

Figure 1:
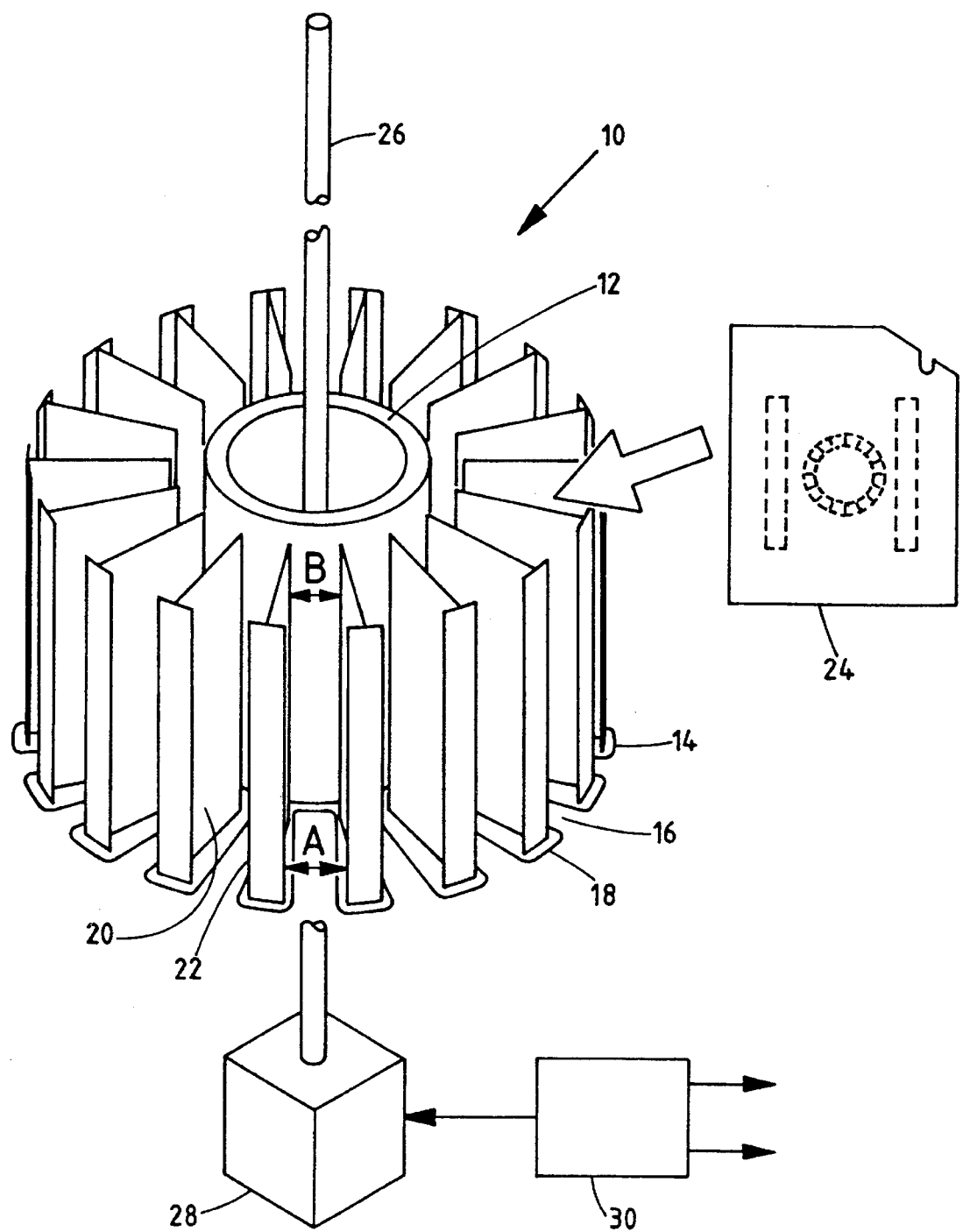
FIG. 1 is a perspective sketch of a magazine in the form of a carousel, used in one embodiment of the present invention.
Figure 2:
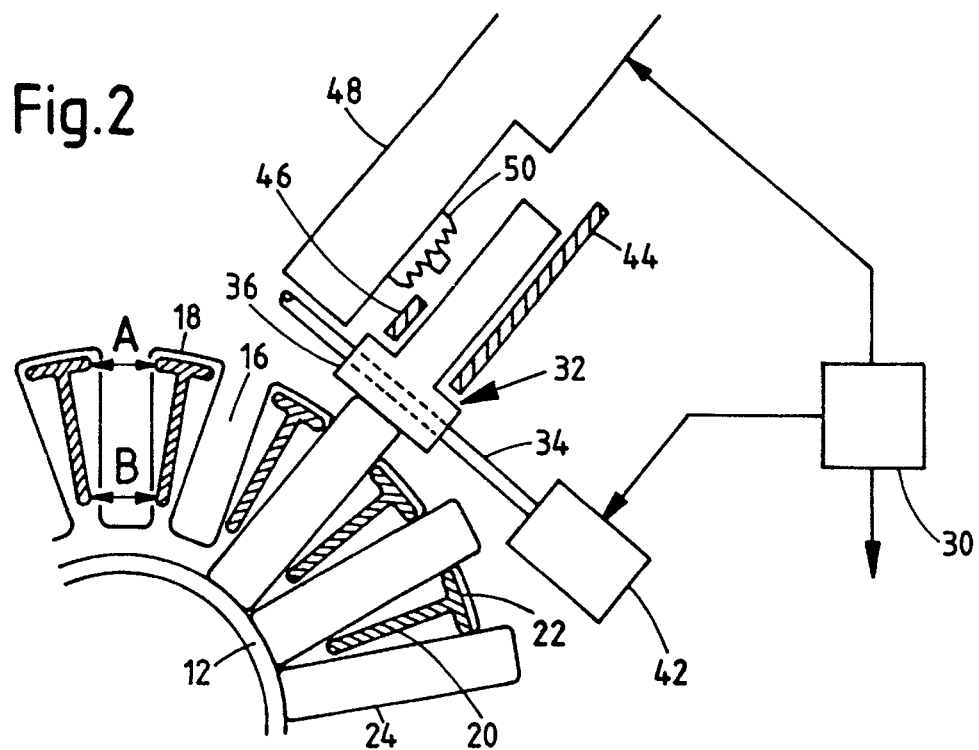
FIG. 2 is a partial plan view of the carousel, transfer mechanism and tape deck in the first embodiment of the invention.

Referring to FIGS. 1 and 2, the carousel 10 comprises an upright inner cylinder 12 having at its lower end a circular flange 14. The flange 14 is formed with a circular array of generally rectangular radial slots, each extending from a closed end adjacent the inner cylinder 12 to an open end at the outer edge of the flange 14. In one example, there are twenty-eight such radial slots 16, which therefore leave between them twenty-eight radial fingers 18. A vertically and radially extending partition wall 20 is formed on each radial finger 18. Each partition wall extends radially inwardly from the outer end of the respective finger 18 to, or near to, the inner cylinder 12. A vertical lip 22 extends along the radially outwardly vertical edge of each partition wall, and the spacing A between adjacent lips 22 is generally equal to the spacing B between the radially inwardly vertical edges of adjacent partition walls 20, and is approximately 1 inch (25 mm). The radial distance between the inner cylinder 12 and the lips 22 is slightly less than 4¼ inches (108 mm), and the height of each partition wall 20 is about 5 inches (127 mm). The carousel 10 can therefore hold twenty-eight IBM 3480 single reel tape cartridges 24, each standing on end with its longer side dimension vertical, and with its shorter side resting on the edges of a pair of the radial fingers 18. The carousel 10 can be rotated about its vertical axis 26 by a stepper motor or servo motor 28 under control of a control system 30.

Figure 3:
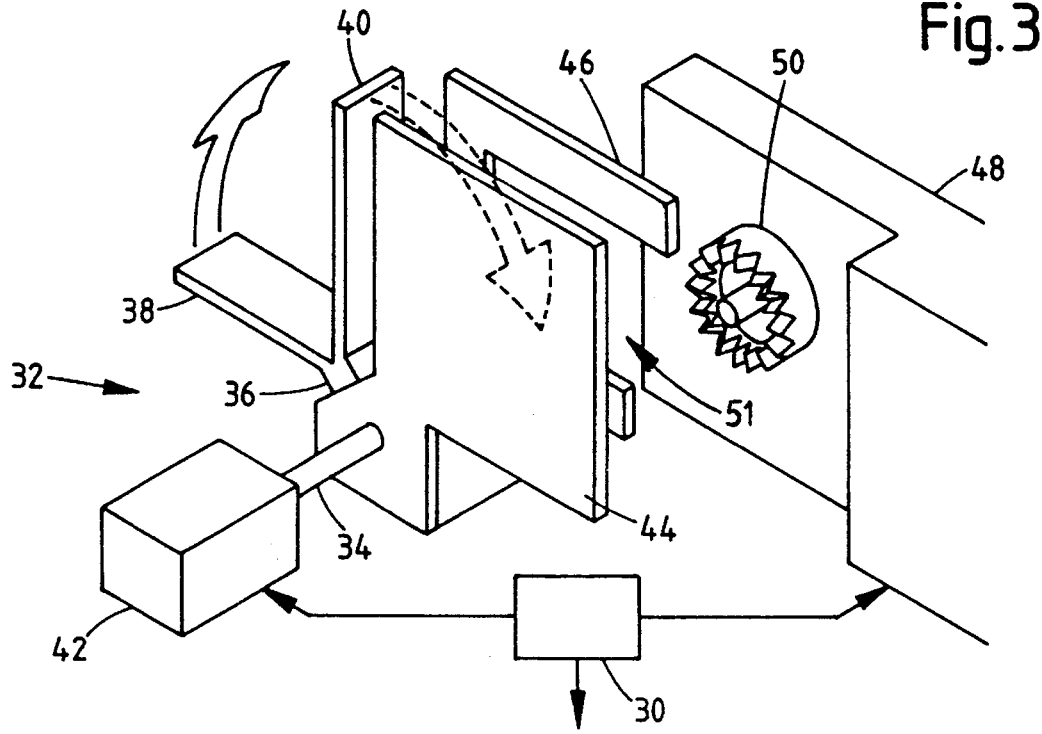
FIG. 3 is a perspective sketch of the transfer mechanism and tape deck in the first embodiment of the invention.

Referring to FIGS. 2 and 3, the transfer mechanism 32 comprises a shaft 34 extending tangentially to the carousel 10 and spaced slightly from the carousel 10 and approximately level with the lower flange 14 of the carousel 10. A carriage 36 is mounted on the shaft 34 and has, as seen in FIG. 3, a horizonal arm 38 and a vertical arm 40. The shaft 34 can be rotated by a stepper motor or servo motor 42, under control of the control system 30, through 90° so that the arm 38 becomes vertical and the arm 40 becomes horizontal, the arm 40 passing between an outer cheek plate 44 and an inner cheek plate 46. A tape deck 48 is disposed to the other side of the inner cheek plate 46 and has a drive hub 50 with a horizontal axis facing towards the cheek plates 44,46. The transfer mechanism motor 42 can also be operated to translate the cheek plates 44,46 and carriage 36 in the direction of the shaft 34 towards and away from the drive hub 50 of the tape deck 48. Alternatively, a separate motor may be provided for translating the cheek plates 44,46 towards and away from the drive hub 50. The inner cheek plate 46 has a cut-out 51 so that a tape reel of a cartridge 24 disposed between the cheek plates 44,46 can be engaged by the drive hub 50. Although the carousel 10 is not shown in FIG. 3, the carousel is mounted next to the transfer mechanism so that, with the pivoting carriage 36 in the position shown in FIG. 3, the arm 38 extends beneath the circular flange 14 of the carousel 10, and the width of the arm 38 is slightly less than the width of the radial slots 16 in the flange 14 of the carousel 10, so that, as the carriage 36 is pivoted in the direction shown by the arrows in FIG. 3, the arm 38 can rise through an aligned one of the radial slots 16 and engage the shorter edge of the respective cartridge 24.

In operation of the machine, in loading one of the cartridges 24, the carousel motor 28 is operated by the control system to rotate the carousel so that the radial slot 16 for the required cartridge 24 registers with the arm 38 of the carriage 36. The transfer motor 42 is then operated by the control system 30 to pivot the carriage 36 in the direction shown by the arrows in FIG. 3. The arm 38 therefore rises up through the radial slot 16 for the selected cartridge 24, and the arm 38 engages the shorter edge of that cartridge. The cartridge is therefore tipped out of the carousel 10, with the shorter edge of the cartridge 24 resting on the arm 38, and with the longer edge of the cartridge 24 resting on the arm 40 of the carriage 36, and the cartridge 24 becomes sandwiched between the cheek plates 44,46 after the carriage 36 has been pivoted through a right angle. The motor 42 is then operated by the control system 30 to translate the carriage 36 and the cheek plates 44,46 towards the drive hub 50 so that the tape reel of the cartridge 24 engages the drive hub 50. The tape of the cartridge 24 can then be loaded into the tape deck 48 in a known manner.

In operation of the machine to return a loaded cartridge to the carousel, firstly the tape of the cartridge 24 is retracted back into the cartridge 24 in a known manner. The motor 42 is then operated by the control system 30 to translate the cheek plates 44,46, the carriage 36 and the cartridge 24 to pull the cartridge off the drive hub 50. The motor 42 is then operated by the control system 30 to pivot the carriage 36 through a right angle in the opposite direction to that shown by the arrows in FIG. 3, and the cartridge 24 is therefore tipped back into its location in the carousel 10. Once the arm 38 is below the flange 14 of the carousel 10, the carousel 10 can then be rotated by the motor 28 under control of the control system 30 so that a different cartridge 24 can be selected.

It should be noted that, by using the pivoting carriage 36, the need to have a jaws mechanism which can grip cartridges and place them on the tape deck 48 is obviated.

It will also be noted that by arranging the cartridges 24 on end in the carousel, a compact design of carousel 10 can be provided. In the example shown, the carousel could have a diameter of 17.4 inches (441 mm) and the inner cylinder 12 may have a diameter of 8.75 inches (222 mm) and the carousel may hold twenty-six cartridges with the radially inner longer edges of the cartridges almost touching each other.

Figure 4:
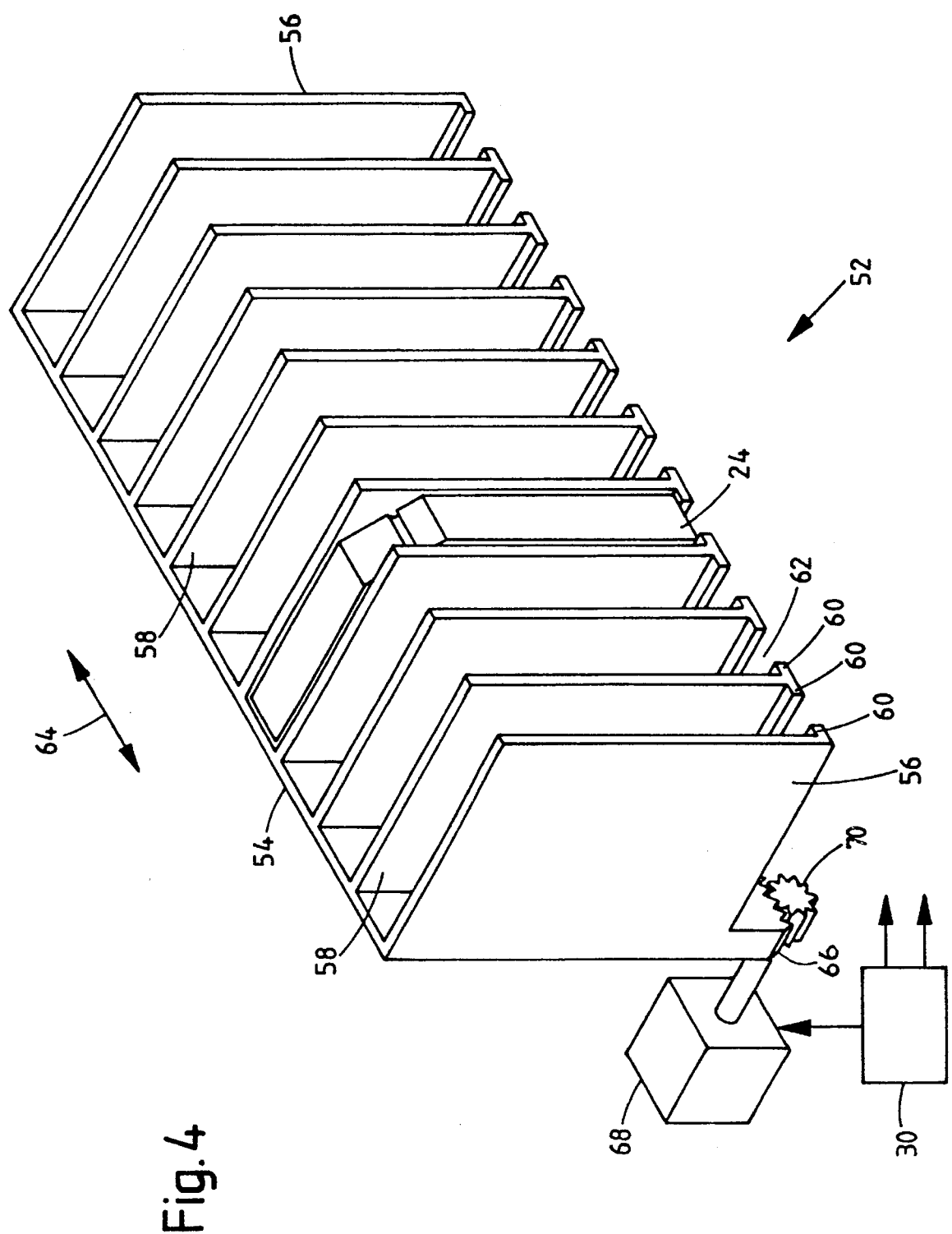
FIG. 4 is a perspective sketch of a magazine for use in another embodiment of the invention.

FIG. 4 shows an alternative magazine 52 which holds ten cartridges 24, only one of which is shown, in a linear array. It will be appreciated that cartridges with different capacities, say eight cartridges, may also be provided. The magazine 52 has a rear wall 54, two end walls 56, and nine dividing walls 58 to provide spaces for the ten cartridges. Lips 60 extend along the lower edges of the end walls 56 and dividing walls 58 to prevent the cartridges from falling out of the magazine, but so as to provide a slot 62 beneath each cartridge. Suitable guides (not shown) are provided to guide the magazine 52 for sliding movement in its longitudinal direction shown by the arrow 64. A toothed rack 66 is formed along the magazine, and a stepper motor 68 of the like with a suitable pinion 70 is controlled by the control system 30 so that the magazine can be moved to a desired position. The transfer mechanism 32 as shown in FIG. 3 is located to the side of the magazine 52 in a similar fashion to that described with reference to FIG. 2. Thus, the controller 30 can cause the motor 68 to position the magazine 52 longitudinally so that the slot 62 for the desired cartridge is aligned with the arm 38 of the carriage 36. The motor 42 is then operated to pivot the carriage 36 so that the desired cartridge is tipped out from the magazine into alignment with the drive hub 50. The motor is then operated to slide the cheek plates 44,46 so that the cartridge engages the drive hub 50 of the tape drive. A reverse operation is carried out to return the cartridge to its space in the magazine, so that a different cartridge can then be selected.

It will be appreciated that many modifications and developments may be made to the machines described above, which have been given as only two examples of the invention, without departing from the spirit and scope of the invention.

For example, the invention may be applied to single reel cartridges other than the IBM 3480 cartridge mentioned above, and also to twin reel cartridges. The invention may be used with cartridges of various types of recording tape, such as magnetic tape and optical tape.

What I claim is:

1. A tape drive machine, comprising:

a tape deck having a drive hub;

a magazine for storing a plurality of recording tape cartridges, said magazine being formed with a slot beneath each of said cartridges, and each of said cartridges, when disposed in the magazine, having a lower edge and an outer edge adjacent the lower edge; and transfer means for transferring said cartridges between said magazine and said deck, said transfer means comprising:

a carriage which is selectively engageable with each of said cartridges in said magazine and which is pivotable about a pivot axis to move a selected one of said cartridges between a position in the magazine and a position out of the magazine and aligned with said drive hub, said carriage having a first arm and a second arm with said first arm, said second arm and said pivot axis being mutually orthogonal; and selector means to move said magazine and said carriage relative to each other in order to select said one of said cartridges with which the carriage engages;

wherein during transfer of said one cartridge between said magazine and said tape deck, said transfer means is operable to pivot said carriage through a right angle whereby said first arm passes through said slot beneath said one cartridge to engage said lower edge of said one cartridge and said second arm engages said outer edge of said one cartridge, and wherein during loading of said one cartridge, once said cartridge is aligned with said drive hub, said transfer means is operable to translate said one cartridge in a direction parallel to said pivot axis into engagement with said drive hub.

2. A machine as claimed in claim 1, wherein said magazine is arranged to store said cartridges in a circular array around an axis with said cartridges disposed radially.

3. A machine as claimed in claim 2, wherein said selector means comprises a motor for rotating said magazine about its axis.

4. A machine as claimed in claim 2, for cartridges which have a longer side dimension, a shorter side dimension and a thickness, wherein said magazine is arranged to store said cartridges with said longer side dimensions generally parallel to said axis of said magazine and with said shorter side dimensions extending generally radially of said axis of said magazine.

5. A machine as claimed in claim 4, for storing single reel tape cartridges for which said longer side dimension, said shorter side dimension and said thickness are nominally 5 inches (127 mm), 4.25 inches (108 mm) and 1 inch (25 mm), respectively.

6. A machine as claimed in claim 1, wherein said magazine is arranged to store said cartridges in a linear array along a longitudinal axis of the magazine.

7. A machine as claimed in claim 6, wherein said selector means comprises means for moving said magazine along said longitudinal axis.

8. A machine as claimed in claim 6, for cartridges which have a longer side dimension, a shorter side dimension and a thickness, wherein said magazine is arranged to store said cartridges with said thickness directions parallel to said longitudinal axis of said magazine.

9. A machine as claimed in claim 8, for storing single reel tape cartridges for which said longer side dimension, said shorter side dimension and said thickness are nominally 5 inches (127 mm), 4.25 inches (108 mm) and 1 inch (25 mm), respectively.

10. A machine as claimed in claim 1, wherein said carriage further comprises a pair of members which sandwich therebetween said one cartridge when said one cartridge has been withdrawn from said magazine, and further comprising means for translating said pair of members to translate said one cartridge into and out of engagement with said drive hub.

* * * * *